United States Patent [19]

Nagashima

[11] Patent Number: 4,642,075
[45] Date of Patent: Feb. 10, 1987

[54] MULTIPLE SPROCKET WHEEL

[75] Inventor: Satoshi Nagashima, Souka, Japan

[73] Assignee: Sakae Ringyo Co., Ltd., Japan

[21] Appl. No.: 741,184

[22] Filed: Jun. 4, 1985

[30] Foreign Application Priority Data

Dec. 29, 1984 [JP] Japan ............................ 59-198720[U]

[51] Int. Cl.$^4$ ............................................ F16H 55/12
[52] U.S. Cl. .................................... 474/160; 474/164; 474/158
[58] Field of Search ....................... 474/158, 160, 164; 74/160

[56] References Cited

U.S. PATENT DOCUMENTS 4,380,445  4/1983  Shimano .......................... 474/160 X Primary Examiner—James A. Leppink
Assistant Examiner—Frank H. McKenzie, Jr.
Attorney, Agent, or Firm—Lowe, Price, Leblanc, Becker & Shur

[57] ABSTRACT

A multiple sprocket wheel used as a unit in a two-wheeled vehicle and for a multi-speed gear without involving separation of a chain guard from a plurality of sprockets.

4 Claims, 2 Drawing Figures

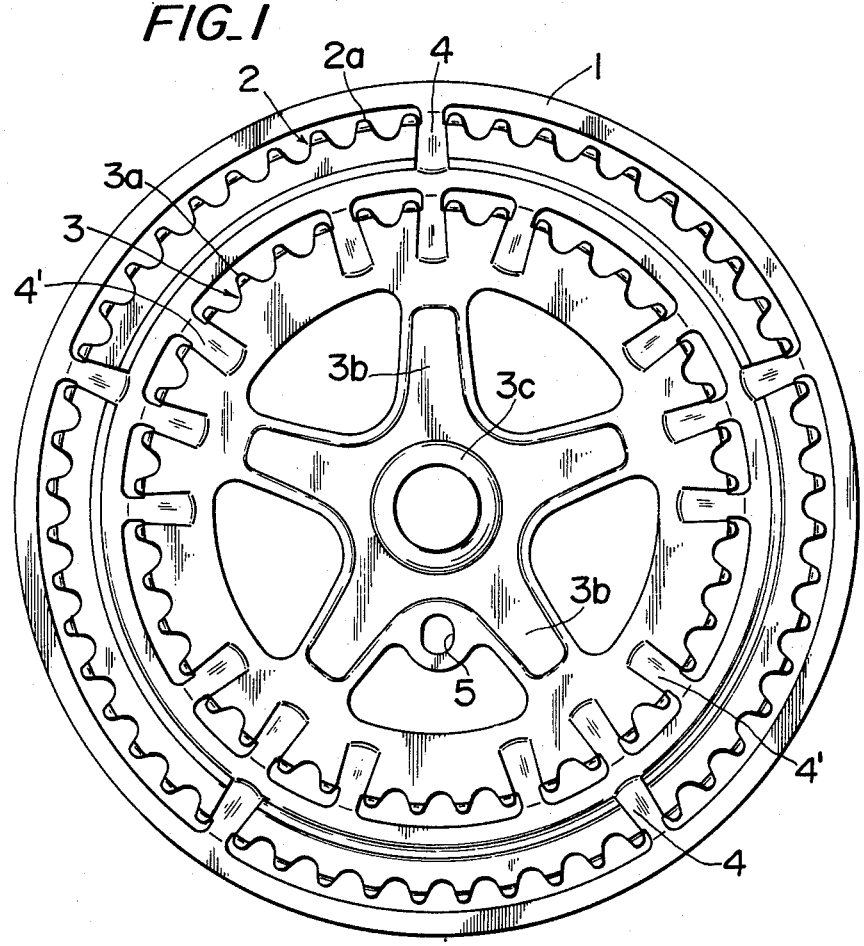

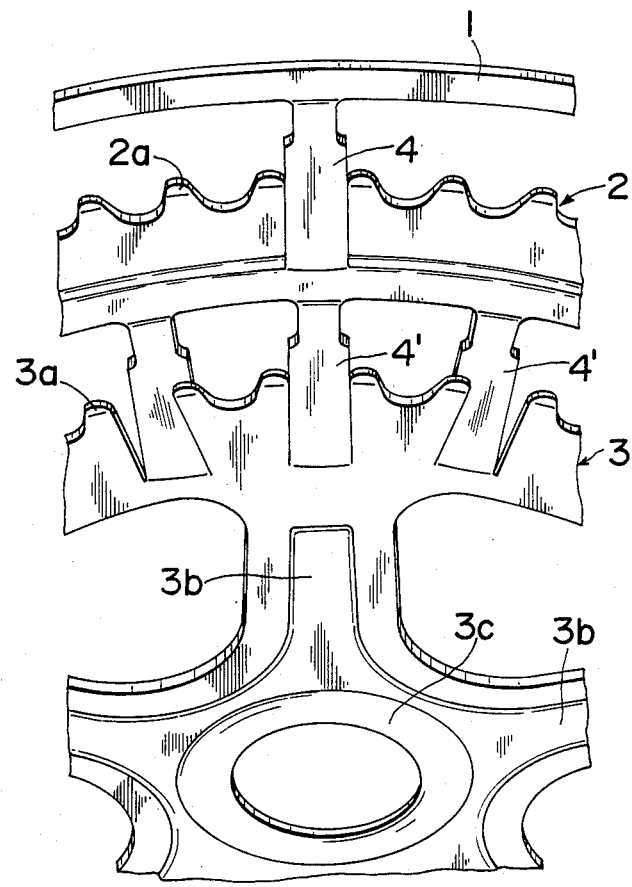
FIG_2

MULTIPLE SPROCKET WHEEL

BACKGROUND OF THE INVENTION

This invention relates to an improvement in a multiple sprocket wheel used for the change-over of a gear for bicycles and the like.

A conventional multiple sprocket wheel is arranged such that a chain guard and plural sprocket wheels of different diameter are separately manufactured, and assembled by use of a spacer and bolts or the like.

Where the chain guard and plural sprockets are separately manufactured in the aforementioned manner, this will require an assembly operation and necessitate the use of bolts and the like, thereby increasing the number of parts and rendering the production expensive.

In view of the above, it has recently been proposed that a chain guard of large diameter and a plurality of sprockets are punched out of a steel plate in such a manner, as to leave a plurality of connection segments, and that the chain guard and a plurality of sprockets are arranged in parallel with each other at predetermined intervals with a plurality of the connection segments bent, thereby obtaining a multiple sprocket wheel as a unit (for example, see Japanese Utility Model Publication No. 20475/82 and Japanese Patent Publication No. 26031/80).

With this arrangement of any number of sprocket wheels manufactured as a unit, a plurality of connection segments are, however, fabricated in such a manner that one or more teeth formed circumferentially of each sprocket are made unavailable. This arrangement is unsatisfactory when used in a sporting bicycle for hillcycling because the chain may possibly be disengaged from the teeth of the sprockets thus requiring the chain guard to be mounted on the side of the sprockets of small diameter.

SUMMARY OF THE INVENTION

It is, therefore, an object of the present invention to provide a multiple sprocket wheel which is adapted to prevent disengagement of the chain.

The present invention is characterized by a multiple sprocket wheel which includes a chain guard of large diameter and a plurality of sprockets integrally coupled by connection segments to each other, and in that a plurality of teeth are equidistantly formed on each of the sprockets at pitches corresponding to the pitches of links of the chain with the connection seqments defined between the adjacent teeth.

These and other objects of the invention will be apparent from the following description and accompanying drawings in which:

BRIEF DESCRIPTION OF THE DRAWINGS

FIG. 1 is a front view of a multiple sprocket wheel according to the present invention, and FIG. 2 is a perspective view showing an essential part of the wheel of FIG. 1 on an enlarged scale.

DESCRIPTION OF THE PREFERRED EMBODIMENTS

Referring now to the drawings and in particular to FIG. 1, a multiple sprocket wheel according to the invention includes a chain guard 1 of large diameter and a pair of sprockets 2, 3 of diameters successively smaller than that of the chain guard 1. The chain guard 1 and the sprockets 2, 3 are fabricated by punching them out of a steel plate to leave a plurality of connection segments 4, 4'.

As shown in FIG. 2, the respective connection segments 4, 4' which connect the chain guard 1 to the sprocket 2 and the latter to the other sprocket 3 are bent transversely of the chain guard 1 (sprocket 2) to thus arrange the chain guard 1, the sprocket 2 of large diameter, and the other sprocket 3 of small diameter in order and in parallel with each other. A plurality of teeth 2a, 3a are equidistantly formed circumferentially of the sprockets 2, 3 respectively to correspond to pitches of a chain (not shown). A boss 3c is defined by arms 3b and in the center of the other sprocket 3 of small diameter for mounting on a crank shaft. A hole 5 is bored in the proximity of the boss 3c for use in fixing a crank.

Next, a plurality of the connection segments 4 which connect the chain guard 1 to the sprocket 2 of large diameter are disposed between the teeth 2a, 2a which are arranged equidistantly on the sprocket 2. On the other hand, a plurality of connection segments 4' which connect the sprocket 2 of large diameter to the other sprocket 3 of small diameter are formed between the teeth 3a, 3a at equidistances on the other sprocket 3. In this manner, the connection segments 4 or 4' are provided between the teeth 2a, 2a or 3a, 3a corresponding to the pitches of the chain so that the teeth 2a, 3a are made fully available to thereby effectively prevent the chain from disengaging from the sprocket 2 or 3.

Although the invention has been described with reference to a specific embodiment of the sprocket wheel for a two-speed gear having the two sprockets 2 and 3, it is apparent that the invention may be embodied in the sprocket wheel for a gear of three or more speeds.

According to the invention, the multiple sprocket wheel, which includes the chain guard of large diameter and a plurality of sprockets of different diameters integrally coupled by the connection segments to each other, is designed to provide teeth equidistantly on the sprockets to correspond to the pitches of the links of the chain with the connection segments disposed between the adjacent teeth. With this arrangement, the chain guard of large diameter and a plurality of the sprockets may be integrally connected to each other while making each of the teeth on the sprocket available. For this reason, a novel and unique multiple sprocket wheel is provided which prevents the chain from disengaging from the sprocket and eliminates the need for an extra chain to be trained over the sprocket of small diameter.

While the features and advantages of the invention have been described in the forgoing with respect to a preferred embodiment, by way of example, various changes and modifications may be made within the scope of the appended claim without being limited to the embodiment illustrated in the drawings.

What is claimed is:

1. A multiple sprocket wheel assembly, comprising a chain guard of one diameter and a plurality of sprockets having diameters successively less than the chain guard diameter and spaced from the chain guard and each other at predetermined intervals in generally parallel relationship in the order of decreasing diameter, each sprocket having a plurality of teeth equispaced from each other around the entire periphery of the sprocket, and a plurality of connecting segments connecting said sprockets together and to the chain guard, each segment being provided between selected adjacent teeth of an associated sprocket without interrupting the equispaced relationship of said teeth on their sprocket, and adjacent ones of said connecting segments being circumferentially spaced from each other by least two teeth, said chain guard, sprockets and connecting segments being formed from a common plate.

2. The assembly of claim 1, wherein said chain guard, sprockets and connecting segments are punched from a common metallic plate.

3. The assembly of claim 2, wherein at least two of said connecting segments formed between a pair of teeth include as part of said segment a portion of each tooth without affecting the pitch of said teeth.

4. The assembly of claim 3, wherein said connecting segments connect two of said sprockets together in groups of three connecting segments in which the segments of one group are spaced from each other by at least two adjacent teeth and a distance d and each group is circumferentially spaced from an adjacent group by a distance D, wherein $D > d$.

* * * * *